United States Patent
De Waal

(10) Patent No.: US 7,101,522 B2
(45) Date of Patent: Sep. 5, 2006

(54) PRODUCTION OF DICALCIUM PHOSPHATE OR MONOCALCIUM PHOSPHATE

(76) Inventor: Jan Christoffel De Waal, 131 Miller Street, 7140 Western Cape Province, Gordons Bay (ZA)

(*) Notice: Subject to any disclaimer, the term of this patent is extended or adjusted under 35 U.S.C. 154(b) by 254 days.

(21) Appl. No.: 10/296,625

(22) PCT Filed: Apr. 4, 2001

(86) PCT No.: PCT/IB01/00559

§ 371 (c)(1),
(2), (4) Date: Apr. 4, 2003

(87) PCT Pub. No.: WO01/89990

PCT Pub. Date: Nov. 29, 2001

(65) Prior Publication Data

US 2003/0161778 A1    Aug. 28, 2003

(51) Int. Cl.
*C01B 25/32*    (2006.01)
(52) U.S. Cl. ............... 423/309; 423/157.3; 423/157.4; 423/308
(58) Field of Classification Search ............. 423/157.3, 423/308, 309, 157.4
See application file for complete search history.

(56) References Cited

U.S. PATENT DOCUMENTS

| | | | |
|---|---|---|---|
| 852,372 A | 4/1907 | Bergmann | 423/308 |
| 1,788,952 A | 1/1931 | Holz | 423/308 |
| 2,728,635 A | 12/1955 | Miller | |
| 2,882,127 A * | 4/1959 | Le Baron | 428/403 |
| 3,151,938 A | 10/1964 | Seidman | |
| 3,391,993 A | 7/1968 | Cutter | |
| 3,843,767 A * | 10/1974 | Faust et al. | 423/157.3 |
| 4,012,491 A | 3/1977 | Hauge | |
| 4,160,657 A * | 7/1979 | Drechsel | 71/41 |

(Continued)

FOREIGN PATENT DOCUMENTS

FR    1128591    1/1957

(Continued)

OTHER PUBLICATIONS

Database, WPI Section Ch, Week 9425 Derwent Publications Ltd., London, GB, Class C04, AN 94-208026 XP002102469 and SU 1 810 319A (Caspian Area Ore Metall Prodn. Assn., Apr. 23, 1993.

(Continued)

*Primary Examiner*—Wayne A. Langel
(74) *Attorney, Agent, or Firm*—Bennett Jones LLP

(57) ABSTRACT

A process is provided for the production of dicalcium phosphate form a phosphate source material in which a solution of phosphoric acid is produced by the action of a suitable mineral acid, generally sulphuric acid, on a phosphate source material. Calcium fluoride is precipitated at a pH of between 3.5 and 4.5 followed by hydrolyzing the solution by diluting it with water to a ratio of approximately 1:7 to about 1:10 monocalcium phosphate to water at a temperature of approximately 40 degrees Centigrade to form a primary precipitate containing substantially all of the fluoride present as $CaF_2$ together with some dicalcium phosphate and a primary calcium and phosphate containing solution. The primary precipitate is dissolved, the pH adjusted to form 3.5 to 4.5 and the hydrolyzation repeated to form a secondary precipitate containing substantially all of the fluoride present as $CaF_2$ together with some dicalcium phosphate and a secondary calcium and phosphate containing solution. The secondary precipitate can optionally, if required, by again processed in the same way to recover more phosphates. The product dicalcium phosphate is recovered from the combined calcium and phosphate containing solutions.

12 Claims, 1 Drawing Sheet

U.S. PATENT DOCUMENTS

| | | | |
|---|---|---|---|
| 4,222,990 A * | 9/1980 | Drechsel | 423/158 |
| 4,435,370 A * | 3/1984 | Holcomb et al. | 423/158 |
| 4,524,054 A * | 6/1985 | George et al. | 423/308 |
| 5,427,757 A * | 6/1995 | Erickson et al. | 423/319 |
| 6,562,308 B1 * | 5/2003 | Carstens et al. | 423/157.3 |
| 6,676,914 B1 * | 1/2004 | Sweat et al. | 423/319 |

FOREIGN PATENT DOCUMENTS

FR          2289443       3/1978

OTHER PUBLICATIONS

Ullmanns Encyclopedia of Industrial Chemistry, Fifth Edition, vol. A 19, pp. 498-499 XP002102468, no date.

* cited by examiner

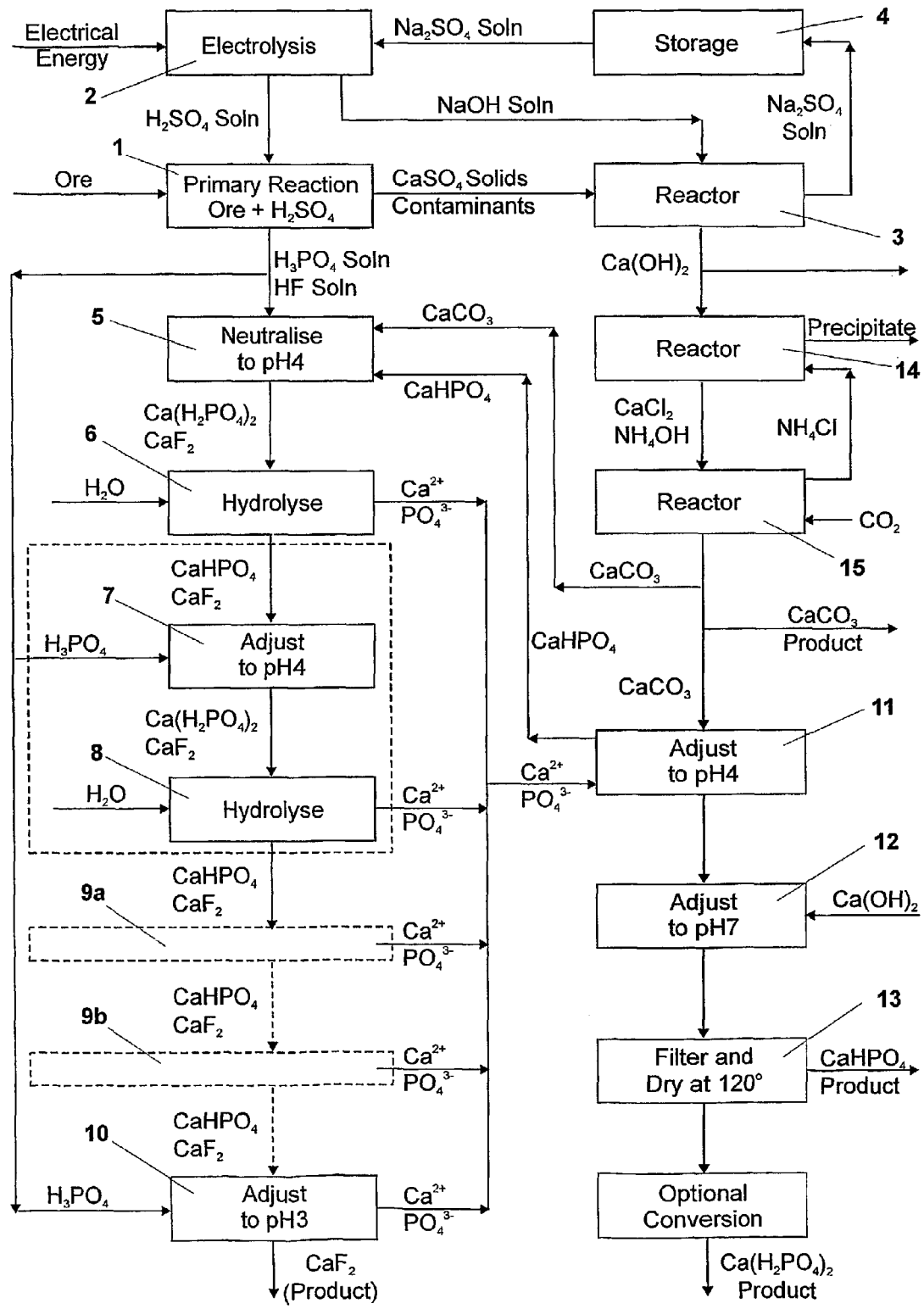

PRODUCTION OF DICALCIUM PHOSPHATE OR MONOCALCIUM PHOSPHATE

FIELD OF THE INVENTION

This invention relates to the production of dicalcium phosphate $(Ca(H_2PO_4)_2)$ or monocalcium phosphate $(CaHPO_4)$ from a source of phosphate, generally a phosphate ore, and typically one containing a significant amount of fluoride. More particularly, the invention relates to process in which a high recovery of phosphate can be achieved whilst fluoride contained in the source material can be eliminated to a desired extent.

BACKGROUND TO THE INVENTION

It is typical for many phosphate ores to contain fluoride which is not readily separated from the phosphate but needs to be eliminated to at least some extent dependent on the use to which will be product dicalcium phosphate or monocalcium phosphate is to be put. As a general rule, dicalcium phosphate for use in animal feeds must, for example, contain less than 1000 ppm (parts per million) fluoride.

One procedure typically used is to treat the ore with sulphuric acid which produces a solution of phosphoric acid and hydrogen fluoride and a residue containing other contaminants and calcium sulphate. The solution is treated with calcium carbonate to a pH of about 2.9 to 3.0 in order to precipitate calcium fluoride and thereafter hydrolyzed to yield a precipitate of calcium fluoride and produce a solution of calcium and phosphate ions which can be directly processed to form a usable dicalcium phosphate product. However, in carrying out this process, an amount of dicalcium phosphate is precipitated together with the calcium fluoride and this combined precipitate is discarded as a waste product. The quantity of phosphate discarded in this way can be from 10 to 20 percent of the phosphate present and thus represents a significant loss.

OBJECT OF THE INVENTION

It is an object of this invention to provide a process for the production of dicalcium phosphate or monocalcium phosphate in which the recovery is improved when compared to the process indicated above whilst fluoride can be removed adequately.

SUMMARY OF THE INVENTION

In accordance with this invention there is provided a process for the production of dicalcium phosphate from a phosphate source material comprising the steps of:
  i. preparing a solution of phosphoric acid by the action of a suitable mineral acid on a phosphate source material;
  ii. separating the solution from residual solid materials; and,
  iii. treating the solution with suitable alkaline calcium material to adjust the pH of the solution to between 3.0 and 4.5;
the process being characterized in that further processing comprises the steps of:
  iv. hydrolyzing the solution by diluting it with water to a ratio of approximately 1:7 to about 1:10 monocalcium phosphate to water to form a primary precipitate containing substantially all of the fluoride present as $CaF_2$ together with some dicalcium phosphate and a primary calcium and phosphate containing solution;
  v. separating the primary precipitate formed in step iv from the primary calcium and phosphate containing solution;
  vi. dissolving the primary precipitate and repeating steps iii, iv, and v on the resultant solution to form a secondary precipitate containing substantially all of the fluoride present as $CaF_2$ together with some dicalcium phosphate and a secondary calcium and phosphate containing solution;
  vii. optionally repeating step vi one or more times to produce a tertiary, quaternary, etc precipitate and tertiary, quaternary, etc calcium and phosphate containing solution;
  viii. combining the calcium and phosphate containing solutions and adjusting their pH to above about 5.5 to precipitate dicalcium phosphate; and,
  ix. recovering the product dicalcium phosphate.

Further features of the invention provide for the phosphate source material to be a phosphate ore; for the mineral acid to be sulphuric acid; for the alkaline calcium material used in step iii to be calcium carbonate preferably produced from calcium sulphate generated in the leach process; for the pH referred to in step iii to be about 4.0; for the ratio referred to in step iv to be about 1:7.5; for the water in step iv to be at about 40 degrees Centigrade; for the dissolution of steps vi and, where applicable in step vii, to be effected using a portion of the phosphoric acid produced in step i; for the pH in step viii to be firstly adjusted to about 4.0 to precipitate a small amount of dicalcium phosphate together with the small amount of residual fluoride with the precipitate conveniently being recycled to the neutralisation of step iii followed by further neutralisation conveniently using hydroxide to a pH of about 7.0; and for the calcium fluoride present in the final precipitate formed in step vi or vii to be recovered as a byproduct.

The separations step ii above which is indicated as being optional is available in order to separate fluoride from other contaminants if such a separation is to be effected. Thus, if it is required to recover the fluoride, the separation of step ii is necessary in order to remove the other contaminants from the system. In such a case the fluoride is then substantially pure when separated from the dicalcium phosphate. On the other hand, if the fluoride is to be discarded with the other contaminants, then the separation step ii can simply be omitted and the solids from step iv discarded.

Whilst the product of the process is described as dicalcium phosphate, this product may easily be converted to monocalcium phosphate should this be the required product.

In order that the invention may be more fully understood one embodiment thereof will now be described with reference to the accompanying drawing.

BRIEF DESCRIPTION OF THE DRAWING

The accompanying drawing is a the flowsheet of one embodiment of the invention in which dicalcium phosphate is recovered from a phosphate ore.

DETAILED DESCRIPTION WITH REFERENCE TO THE DRAWING

In the embodiment of the invention illustrated in the flowsheet the invention is applied to a phosphate ore having a relatively high fluoride content.

The ore is firstly subjected to leaching using sulphuric acid at a step indicated by numeral (1) in the flowsheet. The sulphuric acid is conveniently generated by the electrolysis of sodium sulphate in a step indicated by numeral (2) and in a system of the general type forming the subject matter of South African Patent No 96/2838.

The leaching step results in the formation of calcium sulphate and solid contaminants which are filtered off and reacted with the sodium hydroxide formed in the electrolysis step (2) in a reactor indicated by numeral (3) in order to regenerate sodium sulphate which is stored in a reservoir indicated by numeral (4).

The solution produced in the leach step (1) and which contains the leached phosphates in the form of phosphoric acid together with hydrogen fluoride is neutralized using predominantly calcium carbonate to a pH of about 4 in order to precipitate calcium fluoride and a quantity of monocalcium phosphate accompanying it, this step being indicated by numeral (5) in the flowsheet. It is to be noted that the precipitation of calcium fluoride commences at a pH of about 2.9. The amount of dicalcium phosphate precipitated depends largely on the pH and, for this reason, the prior art process in which the precipitate is discarded led to a limitation in the raising of the pH to about 2.9 to 3.0 in order to minimise what was regarded as a serious loss of dicalcium phosphate.

When compared to this, and as will be apparent from the following, the precipitated dicalcium phosphate is, at least to a substantial extent, recovered in the process of the present invention and for this reason a higher pH is employed in an effort to increase the precipitation of calcium fluoride and facilitate filtration.

The resultant slurry is hydrolysed in a step indicated by numeral (6) by diluting with water to a ratio of about 1:7,5 monocalcium phosphate to water at a temperature of about 40 degrees C. Under these conditions approximately 10 percent of the phosphate is present in the resultant precipitate, which forms the primary precipitate, as dicalcium phosphate whilst the balance remains in solution in the resultant primary calcium and phosphate ions containing solution.

The precipitate is filtered off, and treated with phosphoric acid formed in the leach step (1) to yield a slurry having a pH of about 4, alter treatment with a suitable alkaline material to adjust the pH as in a step indicated by numeral (7) and this slurry is ten hydrolysed in a step indicated by numeral (8) under the same conditions as in hydrolyzing of the first slurry in the step indicated by numeral (6).

The precipitate remaining, which constitutes the secondary precipitate, then contains about 10 percent of the phosphate introduced in the primary precipitate (ie about 1% of the phosphate initially leached) with the other 90 percent being present in the solution which forms the secondary calcium and phosphate ion containing solution.

At this stage a recovery of 99 percent of the phosphate has been recovered in the combined primary and secondary calcium and phosphate-containing solutions.

If further purification of the calcium fluoride is required by removal of phosphate, or if it is required to recover more phosphate, the dissolution and hydrolyzing steps identified by numerals (7) and (8) can be repeated as indicated by numeral (9a) and (9b) to produce tertiary and quaternary precipitates and calcium and phosphate-containing solutions. However, for animal feed purposes, it is not envisaged that these additional steps would be carried out.

In any event the final precipitate contains substantially all of the calcium fluoride which is treated with diluted phosphoric acid generated in the leaching step to a pH of about 3 in a step indicated by numeral (10) in order to recover any calcium and phosphate in solution. This solution is combined with the other calcium and phosphate-containing solutions.

The combined calcium and phosphate ion containing solutions are treated with calcium carbonate to a pH of about 4 at a step indicated by numeral (11) and the precipitate which contains residual quantities of fluoride and some dicalcium phosphate is recycled to the neutralisation step (5) of the original phosphoric acid solution created in the leaching step (1).

In the event that a higher purity is required, for example for human consumption, the solution could once again be hydrolyzed as described above.

In any event, after removal of the solids the calcium and phosphate-containing solution is treated with calcium carbonate to raise its pH to about 4 and then with calcium hydroxide to raise its pH further and preferably to about 7 although dicalcium phosphate will start precipitating at a pH of about 5.5. The step is indicated by numeral (12). The dicalcium phosphate is then filtered and dried at a step indicated by numeral (13) to yield a dicalcium phosphate product having less than 1000 ppm fluorine.

If required, the product dicalcium phosphate could be converted to monocalcium phosphate using phosphoric acid in known manner.

Reverting now to the calcium sulphate and solid contaminants fed to the reactor (3), calcium hydroxide is developed in the reactor and this is treated with ammonium chloride in a step indicated by numeral (14) to yield a precipitate which can be further processed for the recovery of any required values such as rare earth metals. A solution of calcium chloride and ammonium hydroxide is generated.

The addition of carbon dioxide to this solution in a reactor indicated by numeral (15) leads to the production of calcium carbonate which can be fed to the neutralisation step (5) of the original phosphoric acid leach solution as well as being used in the adjustment of the pH of the combined calcium and phosphate ion containing solutions. As a result of the fact that there is a build up of calcium in the system calcium carbonate, which is of a high purity, can also be sold off as a product.

It will be understood that the only inputs into the system are the phosphate ore; electrical energy; carbon dioxide; and a small amount of a quality calcium hydroxide for use in step (12) whilst dicalcium phosphate and/or monocalcium phosphate; calcium fluoride; and calcium carbonate can be produced as products.

It will be understood that numerous variations may be made to the embodiment of the invention described above without departing from the scope of this invention which is limited only to the two or more stages of hydrolysis described above.

The invention claimed is:

1. A process for the production of dicalcium phosphate from a phosphate source material comprising the steps of:
   (a) preparing a solution of phosphoric acid by the action of a suitable mineral acid on a phosphate source material;
   (b) optionally separating the solution from residual solid materials; and
   (c) treating the solution with suitable alkaline, calcium material to adjust the pH of the solution to between 3.0 and 4.5;
   (d) hydrolyzing the solution by diluting it with water to a ratio of approximately 1:7 to about 1:10 monocalcium phosphate to water to form a primary precipitate containing substantially all of the fluoride present as $CaF_2$ together with some dicalcium phosphate and a primary calcium and phosphate containing solution;

(e) separating the primary precipitate formed in step (d) from the primary calcium and phosphate containing solution;

(f) dissolving the primary precipitate with phosphoric acid and repeating steps (c), (d) and (e) containing substantially all of the fluoride present as $CaF_2$ together with some dicalcium phosphate and a secondary calcium and phosphate containing solution;

(g) optionally repeating step (f) one or more times to produce a tertiary, quaternary, etc. precipitate and tertiary, quaternary, etc. calcium and phosphate containing solution;

(h) combining the calcium and phosphate containing solutions and adjusting their pH to above about 5.5 to precipitate dicalcium phosphate; and (i) recovering the product dicalcium phosphate.

2. The process as claimed in claim 1 in which the phosphate source material is a phosphate ore.

3. The process as claimed in claim 1 in which the mineral acid used is sulphuric acid.

4. The process as claimed in claim 1 in which the alkaline calcium material used step (c) is calcium carbonate.

5. The process as claimed in claim 4 in which the calcium carbonate is produced from calcium sulphate generated in the leach process.

6. The process as claimed in claim 1 in which the pH referred to in step (c) is about 4.0.

7. The process as claimed in claim 1 in which the ratio referred to in step (d) is about 1:7.5.

8. The process as claimed in claim 1 in which the temperature of the water in step (d) is about 40° C.

9. The process as claimed in claim 1 in which the dissolution of step (f) is effected using a portion of the phosphoric acid produced in step (a).

10. The process as claimed in claim 1 in which the pH in step (h) is firstly adjusted to about 4.0 to precipitate residual fluoride together with a small amount of dicalcium phosphate which is optionally recycled to the neutralization of step (c) followed by further neutralization to a pH of about 4 using calcium carbonate and thereafter using hydroxide to a pH of about 7.0.

11. The process as claimed in claim 1 in which the calcium fluoride present in the final precipitate formed in step (f) or (g) is recovered as a byproduct.

12. The process as claimed in claim 1 in which the product dicalcium phosphate is converted to monocalcium phosphate.

* * * * *